April 29, 1930.                J. A. ANDRUSIS                    1,756,779
                                VEGETABLE GRATER
                               Filed Feb. 7, 1928            4 Sheets-Sheet 1
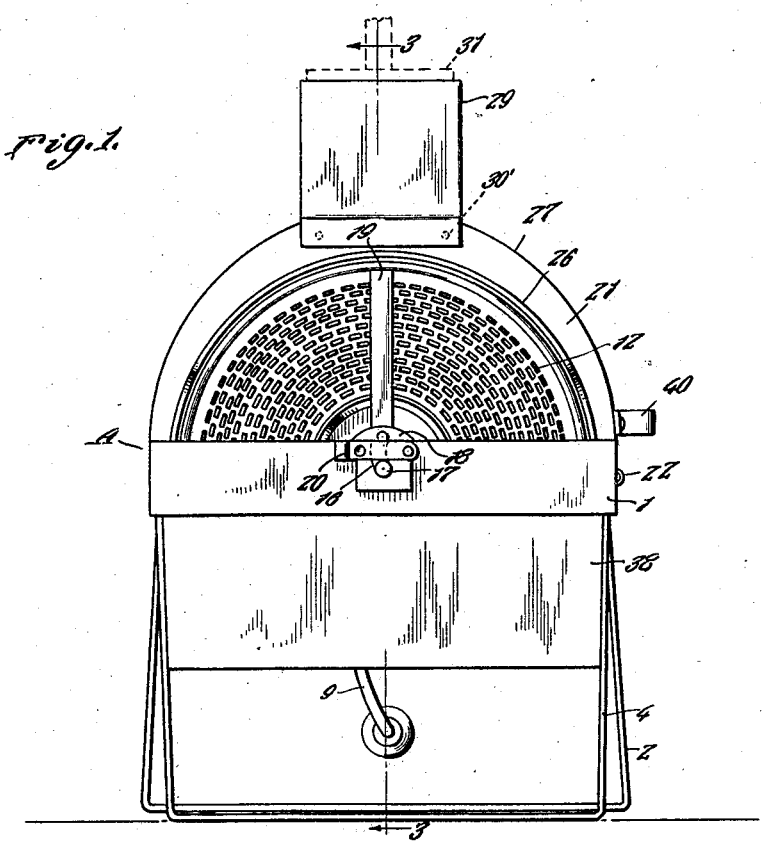
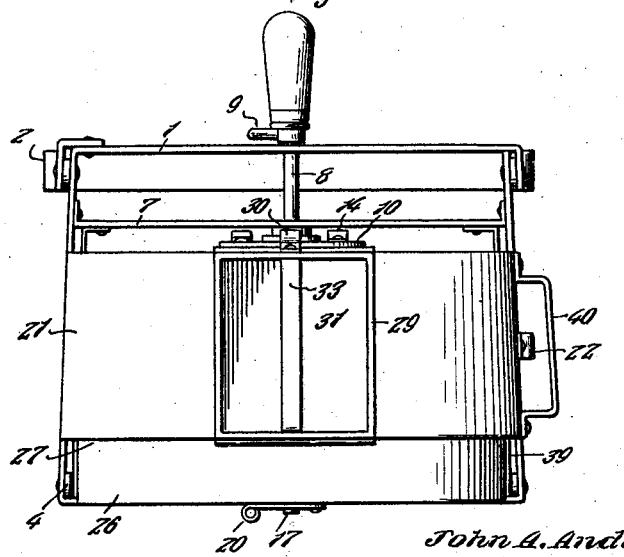

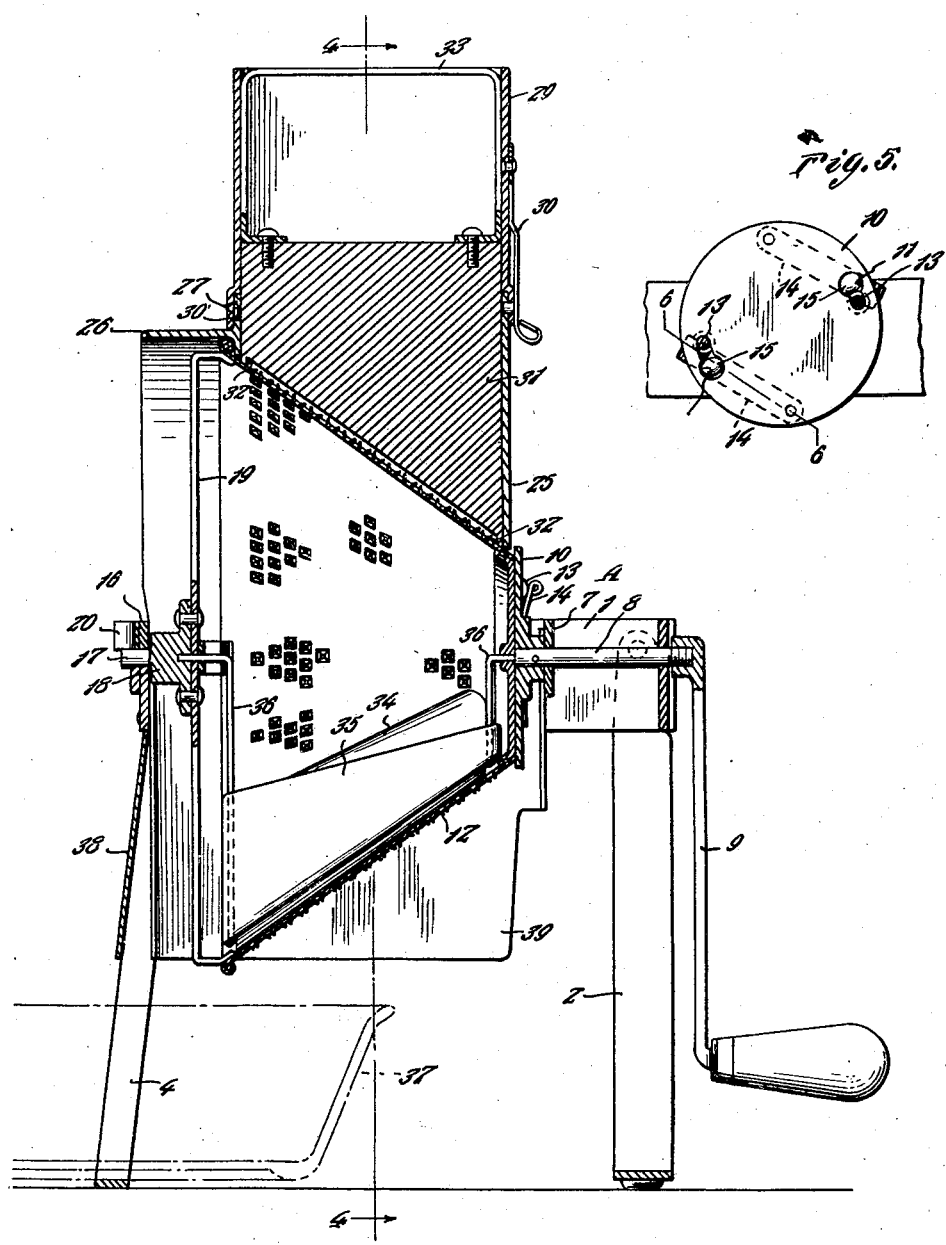

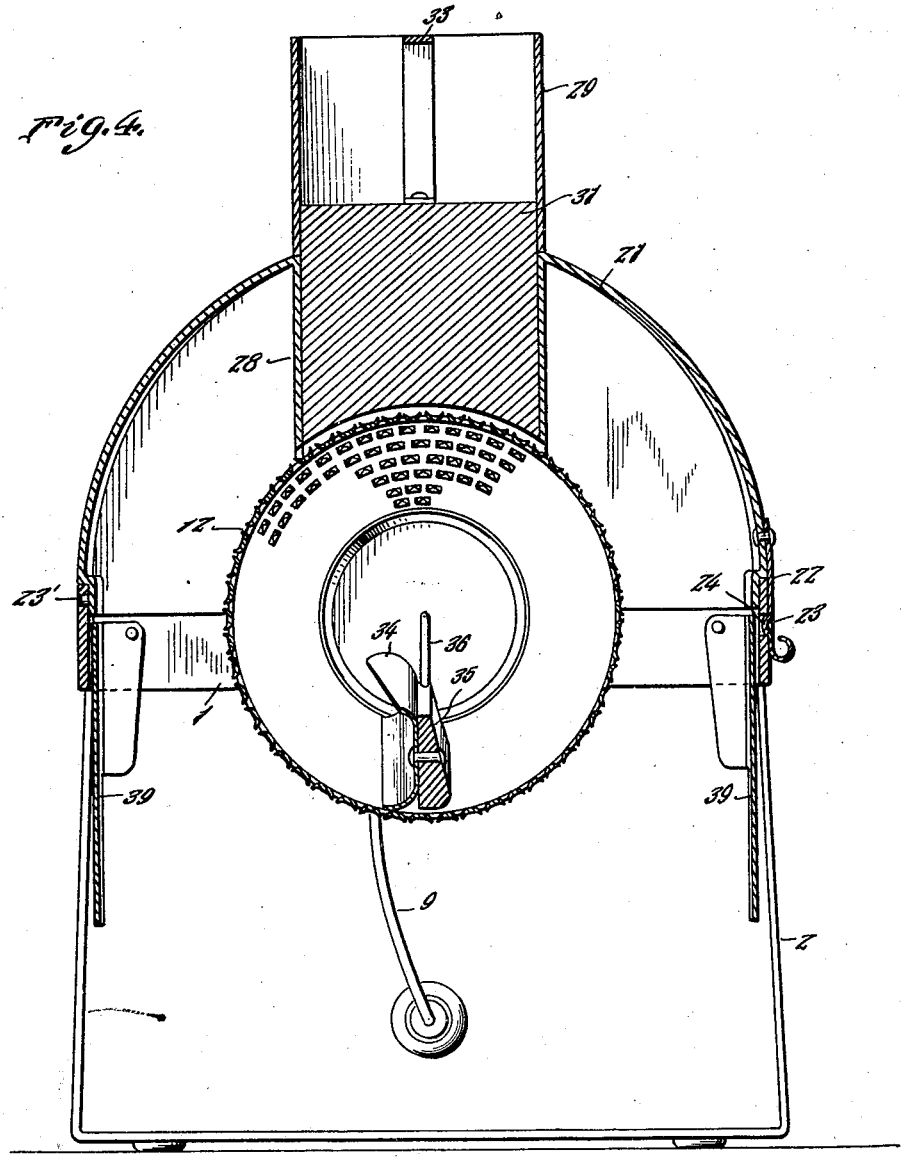

April 29, 1930. J. A. ANDRUSIS 1,756,779
VEGETABLE GRATER
Filed Feb. 7, 1928 4 Sheets-Sheet 4
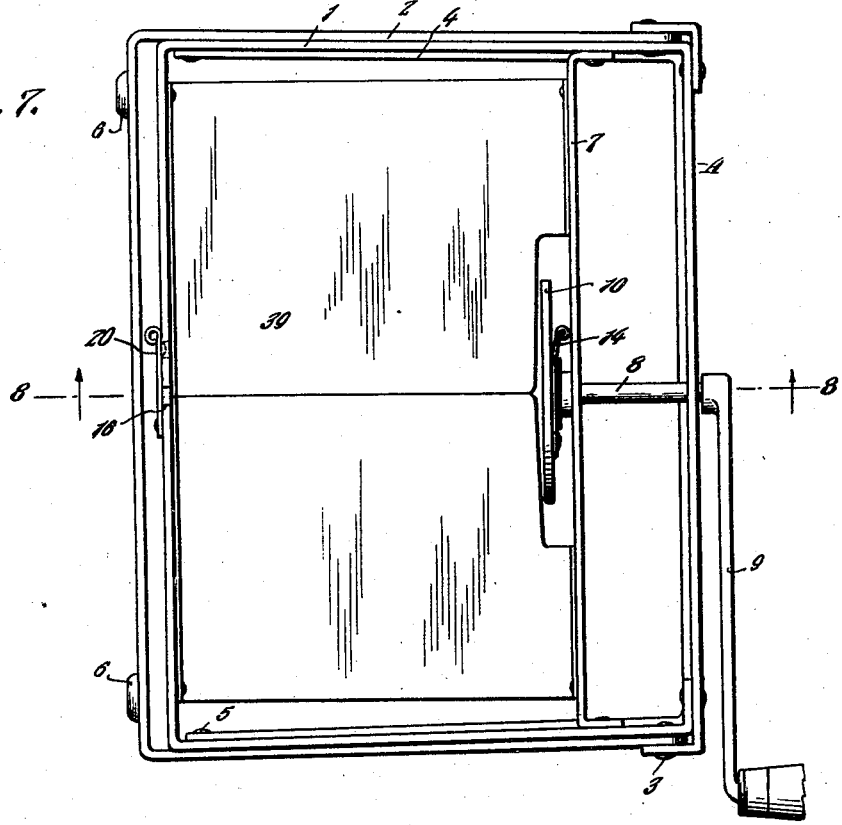
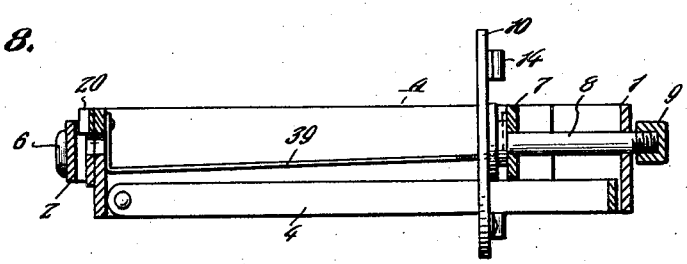
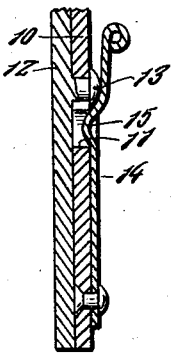
John A. Andrusis
INVENTOR
BY Victor J. Evans
ATTORNEY Patented Apr. 29, 1930

1,756,779

UNITED STATES PATENT OFFICE

JOHN A. ANDRUSIS, OF BROOKLYN, NEW YORK

VEGETABLE GRATER

Application filed February 7, 1928. Serial No. 252,599.

This invention relates to a device for grating vegetables and the like, the general object of the invention being to provide a frame having a frusto-conical member rotatably mounted therein which has its body provided with a plurality of holes having their walls extending outwardly to form grating means, with means for holding vegetables or other articles against the grating surface so that the articles will be cut in fine pieces and the pieces will pass through the holes and fall upon the sloping walls of the frusto-conical member and thus be discharged through the open front end of the same.

A further object of the invention is to provide scraping means for scraping the material from the interior of the frusto-conical member and to cause the material to pass from said member into a dish or receptacle placed under the front end of said member.

A still further object of the invention is to provide a hopper for holding the articles being acted on by the device, with a presser device for pressing the articles against the roughened surface of the grating member.

Another object of the invention is to make the supporting frame collapsible and other parts removable so that the device will occupy but little space when knocked down for storage purposes.

A still further object of the invention is to make the grating member removable so that a similar member carrying slicing blades may be substituted therefor to slice the articles instead of grating them.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of the device.

Figure 2 is a plan view thereof.

Figure 3 is a section on line 3—3 of Figure 1.

Figure 4 is a section on line 4—4 of Figure 3.

Figure 5 is a detail view showing how the small end of the grating member is detachably connected with the disk carried by the handle operated shaft.

Figure 6 is a section on line 6—6 of Figure 5.

Figure 7 is a plan view showing the supporting frame in collapsed condition.

Figure 8 is a section on line 8—8 of Figure 7.

As shown in these drawings, the supporting frame A comprises a rectangular frame 1 having a yoke-shaped member 2 pivoted to its rear part, as shown at 3, and a yoke-shaped frame 4 pivoted to its front part, as shown at 5, the yoke 2 being larger than the frame 1, with its limbs pivoted to the outer walls of the frame 1 and the yoke 4 is smaller than the frame 1 and has its limbs pivoted to the inner walls of said frame so that the two yoke members can be folded upon the frame 1, as shown in Figures 7 and 8. The bight of yoke 2 has attached thereto a pair of buttons 6 of rubber or the like to engage the surface upon which the device is set so as to prevent marring of said surface. A cross piece 7 is fastened to the end pieces of the frame 1 adjacent its rear part and a shaft 8 is journaled in said cross piece and the rear part of the frame 1. A crank handle 9 is fastened to the outer end of the shaft and a disk 10 is fastened to the inner end of said shaft. This disk is provided with the keyhole shaped slots 11.

A frusto-conical member 12 has its small end closed and this end carries the headed studs 13 for engaging the slots 11 so that this end of the member 12 is detachably connected with the disk. The studs are held in the small parts of the slots by the spring latch members 14 fastened to the disk and having projections 15 thereon for engaging the large parts of the slots, thus holding the studs in the small parts thereof. The front part of the frame 1 has a notch 16 therein for receiving a pintle 17 carried by a hub 18 which is attached to the spider 19 connected with the front end of the member 2, which is open, and this pintle is removably held in the notch by the latch 20.

A cover member 21 of substantially semi-circular shape fits over the upper part of the member 12 and is detachably connected with the frame 1 by having pins in one end engaging holes in the frame 1 and a spring latch 22 on its other end which is formed with a projection 23 for engaging a hole 24 formed in the frame 1. The pins at the other end of the frame are shown at 23' in the drawings. The rear of the cover member is closed, as shown at 25, this part of the cover having a semicircular recess in its lower edge to receive the upper half of the small end of the member 12. The front of the cover member has a reduced extension 26, the rear part of which is connected with the major portion of the cover member by a wall 27. A hopper 28 is carried by the cover member, the bottom of this hopper being shaped to snugly fit over the part of the member 12 which it exposes and an extension hopper 29 is detachably connected with the upper end of the hopper 28 by the latch 30 and the pins 30'.

A presser member 31, of considerable weight, is adapted to fit in the hopper to press the articles therein against the member 12, the bottom of this member 31 being shaped to fit over the top part of the member 12 and the sides of said member 31 are formed with flanges 32 to rest against portions of the member 12 to hold the rest of the member 31 out of engagement with the member 12 when the hopper is empty. A handle 33 is fastened to the top of the member 31 and when the hopper is empty and the member 31 is in the hopper, the handle 33 will be flush with the upper end of the extension hopper 29.

A scraper blade 34 of trough shape in cross section is fastened to a weight 35 which is connected with the pintle carrying member 36, one pintle of which engages a bearing formed in the closed end of the member 12 and the other of which engages the bearing formed in the hub 18. Thus the scraper parts will be held in a depending position by the action of gravity, as the member 12 is being rotated, so that the blade 34 will scrape material collecting on the inner walls of the member 12 therefrom and this material will be discharged from the front end of the member and will drop into a dish or the like placed under said member. Such a dish is shown at 37 in dotted lines in Figure 3.

A front apron 38 is fastened to the front yoke 4 and side aprons 39 are pivotally connected with the side portions of the frame 1, these aprons acting to catch any material thrown from the member 12 during the rotation of the same and directing it into the dish. By pivoting the side aprons 39 to the frame 1, they may be folded when the supporting frame A is folded, as shown in Figures 7 and 8. The latch end of the cover member 21 is provided with a handle 40 for facilitating the placing of the cover member in position on the supporting frame and its removal therefrom.

From the foregoing it will be seen that by removing the member 31, vegetables or other articles can be placed in the hopper and then by placing the member 31 on top of the articles, the articles will be forced with considerable pressure against the member 12, so that when said member is turned by means of the handle 9, the roughened outer surface thereof will scrape the articles so that the small pieces produced will pass through the perforations into the interior of the member 12. This material will tend to travel toward the outer end of the member 12, due to the shape of said member, and any material sticking to the interior walls will be scraped therefrom by the weighted scraper so that the grated material will be discharged into the dish. When sliced vegetables or other articles are desired, the member 12 can be removed and a member of similar shape, but provided with slicing knives, may be substituted therefor.

As will be seen, the extension hopper can be removed from the cover member and the cover member and member 12 can be separated from the supporting frame and then said frame can be collapsed so that the entire device will occupy but little space when stored. The handle 40 also enables the operator to steady the device when the same is in use and if desired, additional pressure can be placed on the articles in the hopper by pressing upon the handle 33.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A device of the class described comprising a supporting frame comprising a rectangular frame, front and rear yoke members pivotally connected with the rectangular frame so that they can be folded, a cross piece in the rectangular frame adjacent the rear thereof, a shaft journaled in the rear of the rectangular frame and in said cross piece, a handle on the outer end of the shaft, a disk on the front end thereof, the front part of the rectangular frame having a bearing notch therein, a cutting member of frusto-conical shape having its small end closed and its large end open, a cross piece connected with the front end, a pintle carried thereby engaging the bearing, means for detachably connecting the small end of the member with the disk, a cover member detachably connected with the rectangular frame, a hopper carried thereby for directing articles placed therein against the frusto-conical member and a presser member removably arranged in the hopper.

2. A device of the class described comprising a supporting frame comprising a rectangular frame, front and rear yoke members pivotally connected with the rectangular frame so that they can be folded, a cross piece in the rectangular frame adjacent the rear thereof, a shaft journaled in the rear of the rectangular frame and in said cross piece, a handle on the outer end of the shaft, a disk on the front end thereof, the front part of the rectangular frame having a bearing notch therein, a cutting member of frusto-conical shape having its small end closed and its large end open, a cross piece connected with the front end, a pintle carried thereby engaging the bearing, means for detachably connecting the small end of the member with the disk, a cover member detachably connected with the rectangular frame, a hopper carried thereby for directing articles placed therein against the frusto-conical member, a presser member removably arranged in the hopper, a weighted scraper member, and a pintle carrying member having its lower end connected with each end of the scraper member with its pintles engaging bearings formed at the axis of the frusto-conical member.

3. A device of the class described comprising a supporting frame comprising a rectangular frame, front and rear yoke members pivotally connected with the rectangular frame so that they can be folded, a cross piece in the rectangular frame adjacent the rear thereof, a shaft journaled in the rear of the rectangular frame and in said cross piece, a handle on the outer end of the shaft, a disk on the front end thereof, the front part of the rectangular frame having a bearing notch therein, a cutting member of frusto-conical shape having its small end closed and its large end open, a cross piece connected with the front end, a pintle carried thereby engaging the bearing, means for detachably connecting the small end of the member with the disk, a cover member detachably connected with the rectangular frame, a hopper carried thereby for directing articles placed therein against the frusto-conical member, a presser member removably arranged in the hopper, a weighted scraper member, a pintle carrying member having its lower end connected with each end of the scraper member with its pintles engaging bearings formed at the axis of the frusto-conical member, a front apron fastened to the front yoke member and side aprons pivotally connected with the rectangular frame.

4. A device of the class described comprising a supporting frame comprising a rectangular frame, front and rear yoke members pivotally connected with the rectangular frame so that they can be folded, a cross piece in the rectangular frame adjacent the rear thereof, a shaft journaled in the rear of the rectangular frame and in said cross piece, a handle on the outer end of the shaft, a disk on the front end thereof, the front part of the rectangular frame having a bearing notch therein, a cutting member of frusto-conical shape having its small end closed and its large end open, a cross piece connected with the front end, a pintle carried thereby engaging the bearing, means for detachably connecting the small end of the member with the disk, a cover member detachably connected with the rectangular frame, a hopper carried thereby for directing articles placed therein against the frusto-conical member, a presser member removably arranged in the hopper, a weighted scraper member, a pintle carrying member having its lower end connected with each end of the scraper member with its pintles engaging bearings formed at the axis of the frusto-conical member, a front apron fastened to the front yoke member, side aprons pivotally connected with the rectangular frame, means for detachably connecting the cover member with the rectangular frame and an extension hopper detachably connected with the first hopper.

In testimony whereof I affix my signature.

JOHN A. ANDRUSIS.